No. 757,567. PATENTED APR. 19, 1904.
J. J. QUINLAN.
TOY.
APPLICATION FILED OCT. 21, 1903.
NO MODEL. 2 SHEETS—SHEET 2.
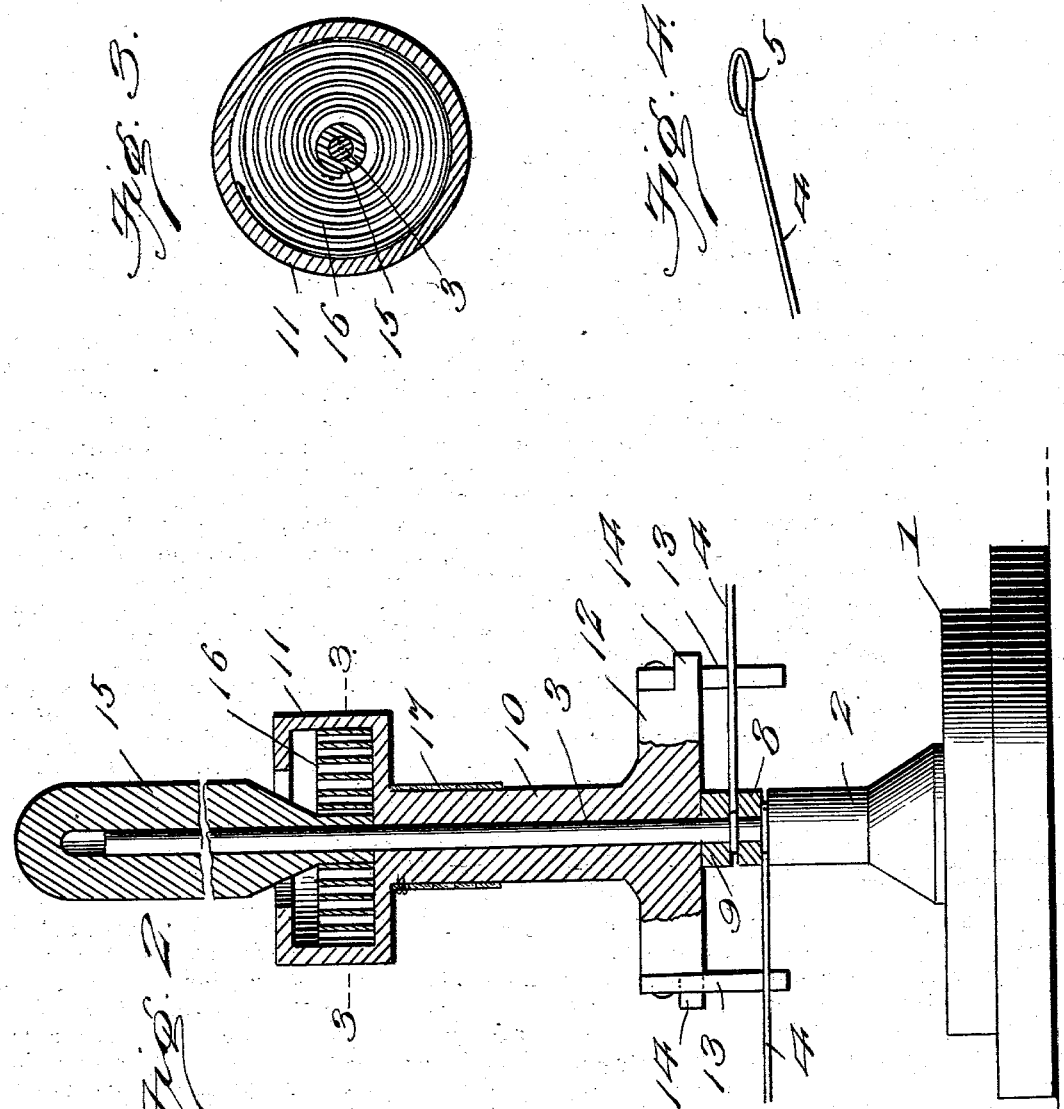

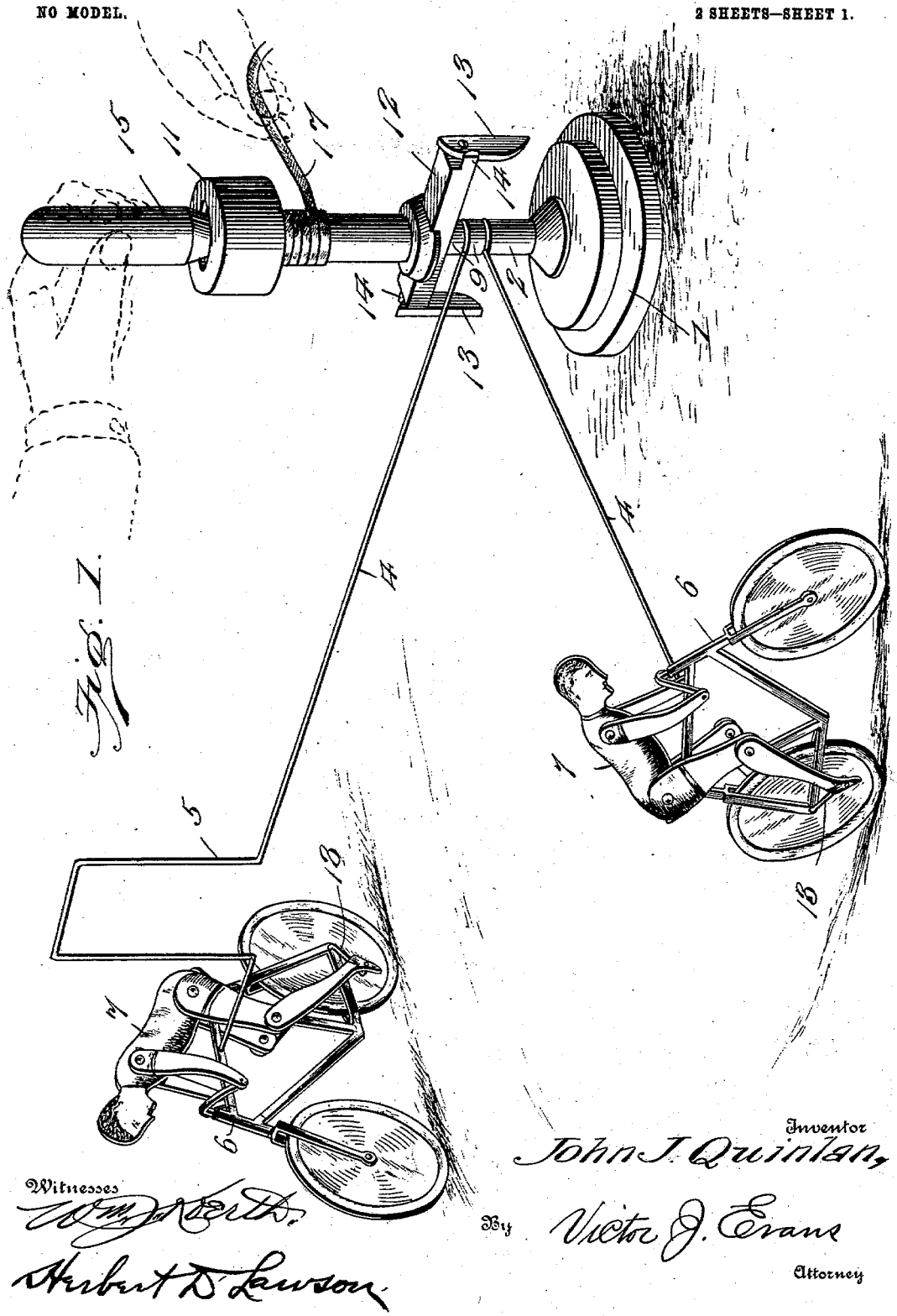

No. 757,567. Patented April 19, 1904.

UNITED STATES PATENT OFFICE.

JOHN J. QUINLAN, OF CHARLESTOWN, MASSACHUSETTS.

TOY.

SPECIFICATION forming part of Letters Patent No. 757,567, dated April 19, 1904.

Application filed October 21, 1903. Serial No. 177,920. (No model.)

*To all whom it may concern:*

Be it known that I, JOHN J. QUINLAN, a citizen of the United States, residing at Charlestown, in the county of Suffolk and State of Massachusetts, have invented new and useful Improvements in Toys, of which the following is a specification.

My invention relates to new and useful improvements in toys; and its object is to provide a spring-controlled device of this character for propelling one or more objects in a circle, said objects to be of any desired form and adapted to simulate racing figures.

A further object is to so connect the rotatable objects with the propelling mechanism as to permit them to be rotated at different speeds.

With the above and other objects in view the invention consists in providing a base upon which is centrally arranged a stem serving to support a revoluble sleeve. Revoluble arms extend from the stem and are adapted to be contacted by oppositely-disposed dogs pivoted to the sleeve. A spring is located within the sleeve and is connected at opposite ends thereto and to a handle loosely mounted on the stem. A cord is adapted to be wound upon the sleeve, so as to tension the sleeve, and when released said spring will revolve the sleeve and press the dogs into contact with the laterally-extending arms, thereby causing the same to rotate.

The invention also consists in the further novel construction and combination of parts hereinafter more fully described and claimed, and illustrated in the accompanying drawings, showing the preferred form of my invention, and in which—

Figure 1 is a perspective view of the device, showing the manner of using the same. Fig. 2 is an elevation of the base and stem and showing the sleeve and the mechanism connected thereto in section. Fig. 3 is a section on line 3 3, Fig. 2, and Fig. 4 is a detail view of the inner end of one of the revoluble arms.

Referring to the figures by numerals of reference, 1 is a base of any suitable form, having a stem 2 extending upward therefrom, and from this stem projects a rod 3, upon which are revolubly mounted one or more arms 4, having eyes 5 at their inner ends, which loosely embrace the rod. One of these arms is longer than the other and contains an inverted-U-shaped extension 5 to permit the passage therethrough of a device connected to the end of the other arm. This device is preferably in the form of a bicycle 6, having a jointed figure 7, mounted thereon and simulating a rider. One of these figures is secured to the outer end of each arm 4. A washer 8 is interposed between the eyes 5 of the arms 4, and a similar washer 9 is arranged upon the other eye and serves to support a sleeve 10, which is loosely mounted on the rod 3 and has a barrel 11 integral with the upper end thereof. Arms 12 extend laterally from the lower end of the sleeve, and to each arm is pivoted a dog 13, which is adapted to contact with one of the arms 4 and which is free to swing upward in one direction, but is prevented from swinging in the other direction by a stop 14, arranged in the path thereof. A handle 15 of any suitable form is loosely mounted on the rod 3 and projects into the barrel 11, and a coiled spring 16 is arranged within the barrel and is secured at its ends to the handle and barrel, respectively. A flexible strip 17 is fastened at one end to the sleeve and is adapted to be wound therearound in any suitable manner.

In using the device the arms 4 are placed in any desired position and the strip 17 is then wound upon the sleeve 10. The operator then grasps the handle 15 in one hand and the strip 17 in the other and unwinds the strip from the sleeve, thereby tensioning the spring 16. The arms 12 will thus be rotated and will draw the dogs 13 over the arms. After the strip 17 has been completely unwound the same is released and the spring 16 immediately unwinds and rapidly rotates the sleeve 10 and throws the dogs 13 against the arms, and they in turn rotate said arms and cause the bicycles 6 to travel rapidly about the base 1. After the spring 16 has become unwound the bicycles 6 will continue to travel about the base by reason of the momentum imparted to them, and if one has attained a greater speed than the other it will possibly overtake and pass it. The unwinding of the spring also winds the strip 17 upon the sleeve 10 and brings it into position for the repetition of the above operation. After the arms 12 and the dogs 13 have stopped rotating they will not prevent further rotation of the arms 4, as these arms upon contacting with the dogs will throw them out of their paths. The figures used in connection with the operating device are, as hereinbefore stated, preferably jointed, and the feet are preferably connected to cranks 18, which rotate with the rear wheels of the bicycles, and thereby impart an up-and-down movement to the legs of the figure.

In the foregoing description I have shown the prefered form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a stem having a rod projecting therefrom, and figure-carrying arms projecting from the rod; of a sleeve revolubly mounted upon the rod, arm-engaging devices connected to the sleeve, a handle, and a spring connected at opposite ends to the sleeve and handle.

2. In a device of the character described, the combination with a stem having a rod projecting therefrom, and a laterally-extending arm loosely mounted upon the rod; of a sleeve revolubly mounted upon the rod, an arm-engaging device connected to the sleeve, a handle loosely mounted upon the rod, a spring connected at opposite ends to the handle and sleeve, and means for winding the spring.

3. In a device of the character described, the combination with a stem having a rod projecting therefrom, and a figure-carrying arm loosely mounted upon and extending from the rod; of a sleeve revolubly mounted upon the rod, a dog pivotally connected to the sleeve and adapted to engage the arm, a drum integral with the sleeve, a handle loosely mounted upon the rod, a spring within the drum and connected at opposite ends thereto and to the handle, and means for winding the spring.

4. In a device of the character described, the combination with a base having a stem thereon, and a rod projecting from the stem; of figure-carrying arms loosely mounted upon the rod, a sleeve revolubly mounted upon the rod, an arm integral therewith, a dog pivoted on the arm and adapted to engage the figure-carrying arm, a handle loosely mounted on the rod, a spring connected at opposite ends to the handle and sleeve, and means for winding the spring.

5. The combination with a base having a stem thereon, and a rod projecting from the stem; of a figure-carrying arm loosely mounted upon and extending from the rod, a sleeve revolubly mounted upon the rod, a dog pivotally connected to the sleeve and adapted to engage the arm, a stop for the dog, a drum integral with the sleeve, a handle loosely mounted upon the rod and projecting into the drum, a spring within the drum and secured at opposite ends to the handle and drum, and means for winding the spring.

6. In a device of the character described, the combination with a base having a stem thereon, and a rod projecting from the stem; of laterally-extending arms loosely mounted upon the rod, figures connected to the arms, a sleeve revolubly mounted upon the rod, arms upon the sleeve, dogs pivoted to said arms and adapted to engage the figure-carrying arms, stops for the dogs, a drum integral with the sleeve, a handle loosely mounted upon the rod and projecting into the drum, a spring within the drum and secured to the handle and drum, and means for winding the spring.

7. In a device of the character described, the combination with a base having a stem projecting therefrom; of arms loosely mounted upon the rod, wheels connected to the arms, cranks revoluble with one of the wheels of each arm, jointed figures mounted above said wheels and connected to the cranks, a sleeve loosely mounted upon the rod, a handle loosely mounted on the rod, a spring connected at opposite ends to the handle and sleeve, arm-engaging dogs connected to the sleeve, and means for winding the spring.

In testimony whereof I affix my signature in presence of two witnesses.

JOHN J. QUINLAN.

Witnesses:
WILLIAM T. COATES,
HARVEY T. CALL.